Jan. 5, 1965     W. S. STERLING     3,164,292
CLOSURE HANDLING MACHINE

Original Filed March 14, 1958     3 Sheets—Sheet 1

INVENTOR.
Walter S. Sterling
BY
Robert S. Churchill
ATTORNEY

INVENTOR.
BY Walter S. Sterling
Robert R. Churchill
ATTORNEY

Jan. 5, 1965 W. S. STERLING 3,164,292
CLOSURE HANDLING MACHINE
Original Filed March 14, 1958 3 Sheets-Sheet 3

INVENTOR.
Walter S. Sterling
BY
Robert C. Churchill
ATTORNEY

United States Patent Office 3,164,292
Patented Jan. 5, 1965

3,164,292
CLOSURE HANDLING MACHINE
Walter S. Sterling, Quincy, Mass., assignor to Pneumatic Scale Corporation, Limited, Quincy, Mass., a corporation of Massachusetts
Original application Mar. 14, 1958, Ser. No. 721,591. Divided and this application Apr. 26, 1961, Ser. No. 105,775
4 Claims. (Cl. 221—10)

This invention relates to a closure handling apparatus and more particularly to apparatus for delivering closures from a bulk supply thereof to a closure handling machine.

The invention has for an object to provide novel and improved apparatus of the character specified wherein provision is made for controlling the delivery of closures to the closure handling machine in accordance with the demand therefor and in a manner such as to maintain an adequate supply of closures in the handling machine commensurate with the rate of withdrawal of closures therefrom for most efficient operation.

With this general object in view and such others as may hereinafter appear, the invention consists in the closure handling apparatus and in the various structures, arrangements and combinations of parts hereinafter described and particularly defined in the claims at the end of this specification.

In the drawings illustrating the preferred embodiment of the invention:

Figure 1:
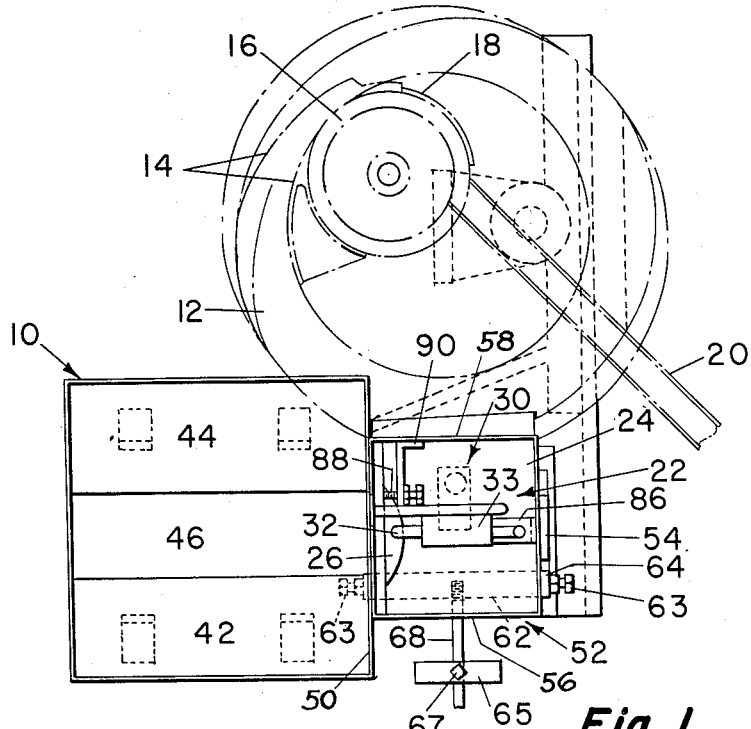
FIG. 1 is a plan view of closure handling apparatus embodying the present invention.

In general the present invention contemplates novel closure handling apparatus embodying a closure supply hopper for supplying closures to a closure handling machine, such as a closure orienting and feeding machine of the type illustrated and described in the United States patent to Walter S. Sterling, No. 2,715,978, issued August 23, 1955. In the operation of such orienting machines the closures, such as screw caps released at random from the bulk supply, are guided through orienting mechanism, and the oriented closures are advanced and delivered into the uper end of a feed chute for delivery to a closure applying machine. The closures, oriented to face in the same direction, are successively withdrawn from the lower end of the chute by transfer means forming a part of the closure applying machine and are transferred into operative relation to the applying machine, as illustrated and described in Patent No. 2,715,978 above referred to.

In such prior machines the closures are permitted to flow continuously by gravity from the bulk supply thereof onto a continuously rotating inclined carrier of the orienting machine to form a group thereof, and in operation the group of closures supplied to the carrier are continuously jostled and changed in position by contact with adjacent closures as they are advanced to cause them to assume a predetermined position to be guided into the orienting mechanism. Those closures which enter the orienting mechanism in other than a predetermined position are rejected to fall back onto the carrier to be again advanced and jostled into position. It will thus be seen that in practice the closures are withdrawn from the randomly arranged group at an indeterminate and variable rate in accordance with the number of closures which happen by chance to assume the predetermined position to enter the orienting mechanism. Also, in such prior machines when the supply chute becomes filled, such as occurs when the applying machine is stopped, or when the oriented closures are supplied in excess of the requirements of the applying machine, the surplus closures entering the orienting mechanism are also rejected to fall back onto the carrier. Prior to the present invention it has been attempted to control the supply of closures from the bulk supply hopper onto the carrier by means of a manually adjustable plate for changing the size of the exit opening from the supply hopper. However, in practice it was found that such control was erratic and haphazard and provided either a surplus of closures on the carrier causing excessive agitation of the closures and interfering with the efficiency of the orienting mechanism, or provided an inadequate supply of closures to the carrier and to the orienting mechanism with which to supply the demand of the applying machine.

In accordance with the present invention provision is made for controlling the delivery of the closures from the bulk supply thereof so as to provide an adequate supply or group of closures on the carrier of the orienting mechanism to keep up with the demand of the applying machine, and to terminate the delivery of closures from the bulk supply when the supply or group on the carrier exceeds an amount necessary to keep up with the demand of the applying machine whereby to avoid unnecessary jostling and agitation and possible marring of the closures on the carrier. The present control mechanism is also arranged to again initiate the delivery of closures from the bulk supply hopper when the group of closures on the carrier falls below a predetermined normal amount whereby to maintain the group of closures on the carrier at a substantially constant amount for most efficient operation of the orienting mechanism and in an amount sufficient to compensate for the number of closures being withdrawn from the group by the orienting mechanism and from the feed chute by the applying machine.

Referring now to the drawings, the present invention is illustrated as embodied in a closure handling, orienting and feeding machine of the type illustrated and described in United States Patent No. 2,715,978 wherein a bulk supply of closures may be stored in a hopper 10 to be delivered to a rotary inclined carrier 12, shown in dotted lines, and which is adapted to advance the randomly arranged closures deposited at the lower end of the carrier to form a group thereof and to carry the closures upwardly into engagement with guide means indicated generally at 14. Successive closures arriving at the upper end of the inclined carrier are guided into engagement with the beveled marginal edge of a rotary orienting disk 16 arranged in a substantially horizontal plane and preferably in a plane slightly inclined downwardly with respect to the plane of the carrier disk 12. As the closures are advanced along the edge of the orienting disk 16 they leave the carrier 12 and are supported between the beveled edge of the orienting disk 16 and a cooperating stationary closure supporting rail 18. In operation those closures assuming a desired predetermined position between the orienting disk 16 and the rail 18 are capable of maintaining their stability and are advanced into the upper end of a delivery or feed chute 20 for delivery to the closure appling or other machine. Those closures assuming other than the desired position are incapable of maintaining their stability between the disk 16 and rail 18 and are permitted to fall back onto the carrier 12 to be returned to the main group of closures at the lower end of the carrier 12 to be again advanced into engagement with the orienting mechanism.

In accordance with the present invention the bulk supply hopper 10 is provided with control mechanism indicated generally at 22 disposed intermediate the supply hopper and carrier 12 and which is arranged to discontinue the delivery of closures from the bulk supply when the group of randomly arranged closures deposited on the rotary inclined carrier 12 of the orienting machine exceeds a normal amount and to again effect delivery from the supply hopper when the group of randomly arranged closures on the carrier returns to or falls below said normal amount. In general the control mechanism includes a pivotally mounted and counterweighted plate 24 across which the closures are arranged to flow from the supply hopper to the carrier 12. The opening in the supply hopper is provided with a gate 26 hinged at 27 and normally held in its open position by a spring 28. The plate 24 is arranged to cooperate with a pneumatically operated control unit indicated generally at 30 forming a part of the control mechanism 22 and which is operatively connected to a pneumatically operated plunger 32 arranged to cooperate with the supply hopper gate 26. In operation when the closures delivered from the supply hopper are permitted to flow freely across the counterweighted plate 24 to join the randomly arranged group in the carrier which are continuously moved past the delivery end of the plate, the gate 26 remains open indicating that the closures are being removed from the group and oriented and deposited in the feed chute 20 at a rate commensurate with the withdrawal of closures from the delivery end of the feed chute by the closure applying machine. However, in the event that a surplus of closures is accumulated on the carrier, such as when the supply of oriented closures exceeds the demand of the closure applying machine causing the surplus closures to be rejected from the orienting mechanism to join the group at the lower end of the carrier, such group is increased to an extent such as to impede the free flow of the closures across the counterweighted plate 24 causing the closures to build up on the plate to an extent such that the weight thereof effects depression of the plate. The depression of the plate is arranged to increase the air pressure in the pneumatically operated control unit 30 which in turn effects outward movement of the plunger 32 to close the gate 26 and to thus discontinue the supply of closures to the carrier. Subsequently, when a sufficient number of closures have been withdrawn from the carrier the closures on the counterweighted plate 24 are permitted to flow into the carrier and the plate returns to its normal position to reduce the air pressure in the pneumatically operated unit 30 whereupon the gate closing plunger 32 is returned to its initial position and the gate 26 is permitted to open to start the flow of closures from the bulk supply hopper 10.

Figure 2:
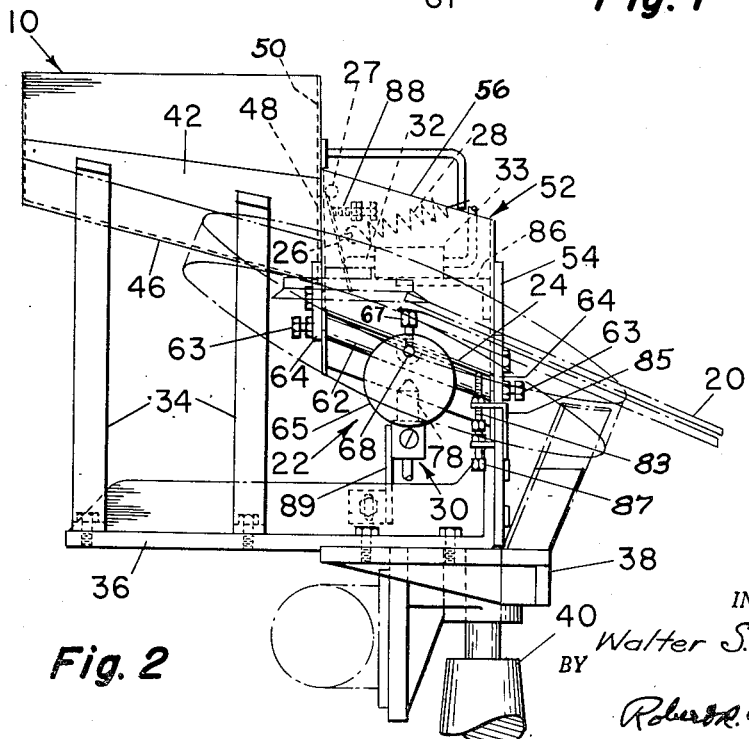
FIG. 2 is a front elevation of the same.
Figure 3:
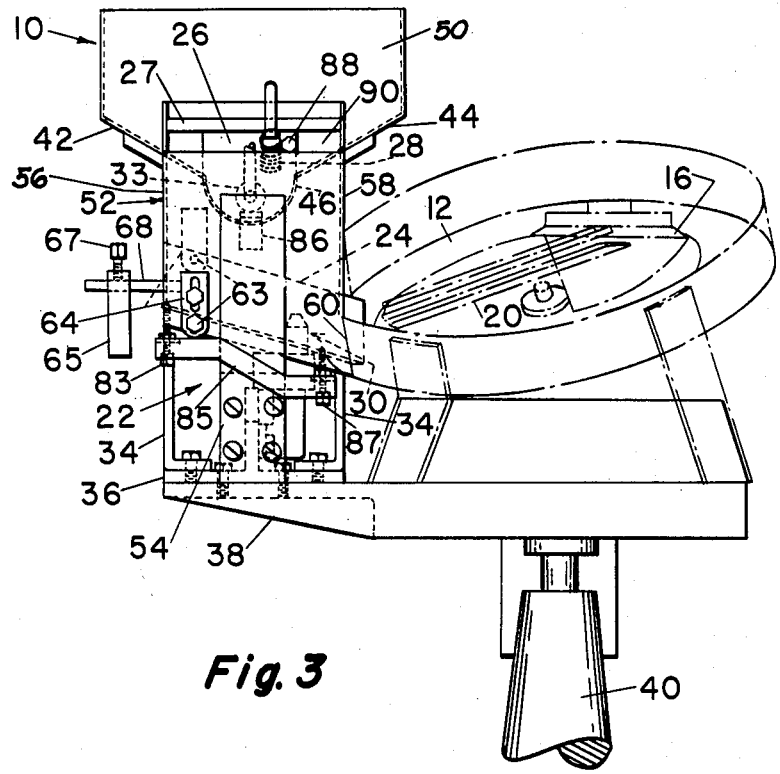
FIG. 3 is a side view of the apparatus.

As herein illustrated, the bulk supply hopper 10 is supported by upstanding arms 34 from a bracket 36 which is secured to a frame member 38 attached to the supporting column 40 of the orienting machine. The supply hopper 10 is provided with inwardly converging side walls 42, 44 at its lower end terminating in a central semicircular and downwardly inclined trough 46. An opening 48 is provided in an end wall 50 of the hopper adjacent the lower end of the trough 46 which is arranged to be closed by the gate 26. The hopper 10 is further provided with a laterally extended and downwardly inclined compartment 52 communicating with the opening 48, the compartment being supported at its outer end by an upstanding arm 54 from the bracket 36. The compartment 52 is open at the top and bottom, the bottom being closed by the pivotally mounted and counterweighted plate 24 which is supported to be inclined in two different planes, one plane shown in FIG. 2 being inclined downwardly with respect to the end wall 50 of the hopper in which the opening 48 is formed, and the other plane shown in FIG. 3 being inclined downwardly with respect to the side wall 56 of the compartment arranged at right angles to the hopper wall 50. The opposed side wall 58 of the compartment 52 is provided with a closure escape opening 60 through which the closures may pass directly onto the continuously rotating inclined carrier 12 of the orienting machine at a point adjacent the lower end of the inclined carrier 12. In other words, the plate 24 is inclined downwardly from its pivoted end toward the carrier in the direction of the length of the plate or in a longitudinal direction, as shown in FIG. 3, and the plate is also inclined downwardly in the direction of the width of the plate or in a transverse direction, as shown in FIG. 2, consistent with the inclination of the rotary carrier.

As herein illustrated, the plate 24 is provided with a hub portion 62 on its underside and is pivotally mounted between trunnion bearings 63 cooperating with the ends of the hub portion and supported in bearing plates 64 attached to opposed side walls of the compartment 52. As shown, a counterweight 65 is adjustably mounted on a stud 66 extended from the hub portion 62 of the plate 24 and in operation the counterweight may be adjusted by a set screw 67 so as to permit a normal flow of closures across the plate and onto the carrier 12 without effecting depression or downward rocking thereof. As above described, when the group of closures in the carrier is increased to an extent such as to impede the free flow of closures across the plate 24 the accumulated closures on the plate will effect downward rocking thereof.

Figure 4:
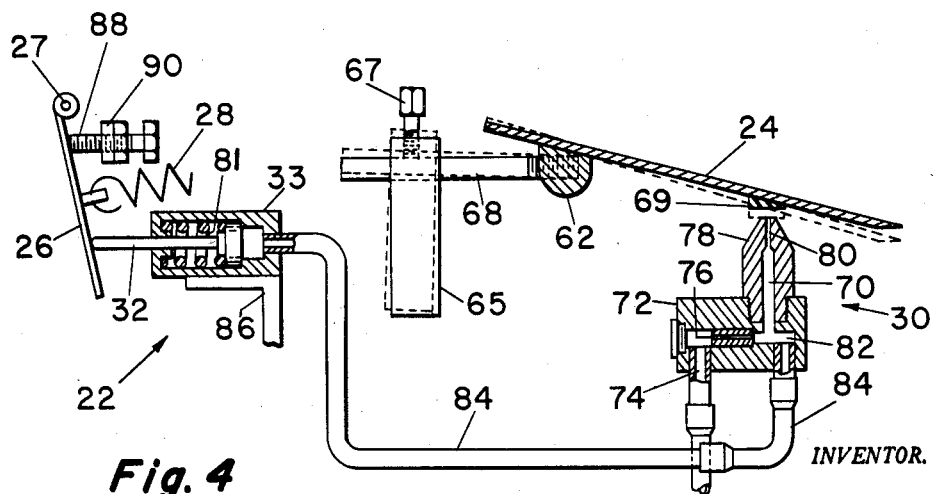
FIG. 4 is a diagrammatic detail view partly in cross section showing the pneumatically operated control mechanism.

The underside of the counterweighted plate 24 is provided with a depending boss 69, as shown in FIG. 4, arranged to cooperate with the pneumatic control unit 30. As herein shown, the pneumatically operated unit 30 is provided with an air chamber 70 formed in a block 72 and having an inlet 74 which may be connected to a regulated source of air under pressure, the inlet having a restricted throat portion 76. The outlet from the chamber comprises a nozzle or jet member 78 which is provided with a relatively small orifice 80. The counterweighted plate 24 is arranged to cooperate with the jet member 78 to control the escape of air from the orifice 80.

The plate 24 is normally disposed so that the boss 69, depending from the underside thereof, is spaced a short distance from the discharge orifice 80, and when the plate is rocked downwardly a relatively short distance by the weight of closures accumulated thereon, to retard the escape of air through the orifice, a relatively large pressure change occurs in the chamber 70. As diagrammatically illustrated in FIG. 4, the chamber 70 is connected by a passageway 82 formed in the block 72 to an air pipe 84 leading to the end of the cylinder 33 of the air plunger 32. The plunger 32 is normally retained in its retracted position by a spring 81 as shown. The cylinder 33 may be supported by an angle bracket 86 secured to a side wall of the compartment 52 and is disposed so that the plunger 32 will engage the gate 26 to close the same when the plunger is extended. The hinged gate 26, normally held in its open position by the spring 28, may be adjustably limited in its outwardly rocked open position by an adjusting screw 88 supported by an angle bracket 90 from the side wall 58 of the compartment 52.

As illustrated in FIG. 3, the inclination of the plate 24 may be adjusted to suit the particular closures being handled, as determined by the size, shape and weight of the closures, so as to control to some extent the rate of flow of the closures across the plate. In other words the gravity flow of the closures across the plate may be reduced by the frictional resistance when the plate is adjusted at a smaller incline. This adjustment may be made by an adjusting screw 83 carried by a bracket 85 extended from the arm 54, the screw 83 being disposed to engage the underside of the plate on the counterweight side of the pivot 63. Provision is also made for limiting the downward rocking movement of the plate by an adjusting screw 87 also carried by the bracket 85 and which is disposed to cooperate with the underside of the plate at the free end of the plate on the opposite side of the pivot 63. The pneumatically operated unit 30 may be supported by a bar 89 mounted for vertical adjustment on the bracket 36, as best shown in FIG. 2, to permit adjustment of the spacing between the air jet 78 and the boss 69 on the underside of the plate.

In operation the gate 26 may be adjusted to limit the opening through which the closures may freely escape by gravity from the hopper 10, the extent of such opening being determined by the size and weight of the particular closures being handled and commensurate with the demand of the orienting machine and the closure applying machine. The counterweight 65 may then be adjusted while the machine is in operation at a position of balance where the weight of the closures passing freely across the plate 24 will not effect depression thereof and at a position of balance such that an accumulation of closures impeded in their travel by an increase of closures in the group on the carrier will effect downward rocking of the plate, as described, such position of balance being determined by the operation of the orienting and applying machines so that the rate of withdrawal of closures from the group in the carrier is substantially commensurate with the withdrawal of closures from the chute 20 by the closure applying machine. It will be observed that the outer end of the plate 24 extends beyond the front wall 58 of the compartment and is preferably disposed a short distance above the upper surface of the continuously moving carrier 12.

In the normal operation of the apparatus, the closures delivered to the carrier 12 across the plate 24 and through the opening 60 of the compartment 52 are advanced upwardly on the inclined carrier to permit succeeding closures to flow freely onto the carrier and to join the group being advanced to the orienting mechanism. Those closures not accepted by the orienting mechanism and those rejected therefrom may roll or tumble down the inclined carrier to join the group at the lower end of the inclined carrier. Thus, the group may be increased by building up one upon another to an extent such that the closures being carried past the delivery end of the plate 24 and the opening 60 will impede the free flow of closures from the plate 24 so that the weight of the closures accumulated on the plate will effect depression thereof. It will be understood that in practice the carrier 12 is rotated at a relatively slow rate of speed in the order of 12 to 15 revolutions per minute so that gentle handling of the closures in the orienting machine is assured.

From the description thus far it will be observed that in operation when the initial adjustments are made, as described, the closures will flow continuously by gravity at a controlled rate through the opening in the hopper, across the counterweighted plate 24 and through the opening 60 in the compartment 52 to join the group on the carrier 12. Such free flow of the closures will continue as long as the number of closures withdrawn from the group are substantially equal to the number added by the controlled flow of the closures being delivered from the hopper to maintain a substantially constant amount of closures in the group on the carrier. However, in the event that the number of closures being accepted by the orienting mechanism is reduced by reason of excessive rejections of closures therefrom which are returned to the group, or because of a slow-down or stopping of the carrier 12 or the closure applying machine the group of closures in the carrier will be increased to an extent such as to impede the flow from the plate. The weight of the closures thus accumulated on the plate will effect downward rocking thereof to actuate the pneumatic control mechanism and close the gate to terminate release of closures from the supply hopper. Subsequently, when the group on the carrier is again reduced by continued withdrawals therefrom, the closures on the plate are free to join the group, thus permitting upward rocking of the plate 24 and opening of the gate 26.

Figure 5:
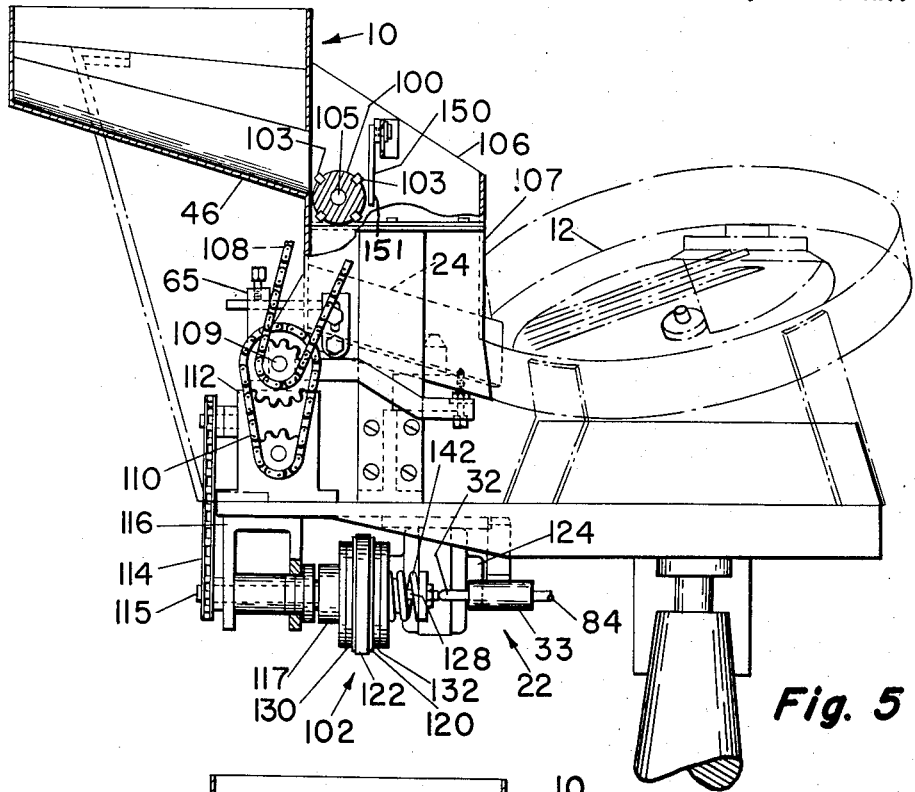
FIG. 5 is a view similar to FIG. 2 illustrating a modified form of the present appartus.
Figure 6:
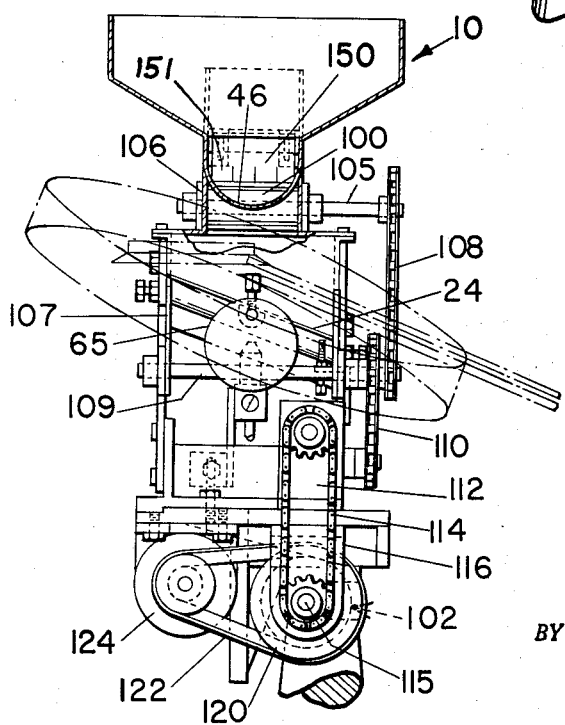
FIG. 6 is a rear elevation of the apparatus shown in FIG. 5.

In a modified form of the invention, as illustrated in FIGS. 5 and 6, instead of providing a gate 26 for controlling the withdrawal of closures from the hopper 10, a driven feed roll 100 may be provided at the delivery end of the trough 46 which may be arranged to be stopped and started in response to the movement of the counterweighted plate 24 and through operation of the pneumatic control mechanism 22 shown in FIG. 4. The modified structure is particularly adapted for use in controlling the flow of those closures, and particularly adapted for controlling relatively large closures, which require jostling and loosening at the delivery end of the trough to break up any jam thereof and to permit a substantially uniform flow or controlled release thereof from the delivery end of the hopper to the counterweighted plate. In general the modified control mechanism includes a normally engaged clutch unit 102 forming a part of the driving mechanism for the driven feed roll 100, and in operation the clutch unit 102 is arranged to be disengaged by operation of the plunger 32 of the pneumatic control mechanism 22.

As illustrated in FIG. 5, the driven feed roll 100 is disposed at the delivery end of the downwardly inclined trough 46 and is arranged to effect release of closures from the hopper 10 onto the counterweighted plate 24 at a controlled rate to join the group of closures on the carrier 12, the pneumatic control mechanism being arranged to discontinue rotation of the feed roll 100 in the event that a surplus of closures is accumulated on the carrier 12. As herein shown, the feed roll 100 disposed adjacent the lower end of the trough 46 is provided with a plurality of relatively short, radial fins 103 extended longitudinally of the roll which are adapted to engage and lift the closures at the delivery end of the trough to free the closures and to effect a substantially uniform advance and release of the closures onto the counterweighted plate 24. As herein shown, the feed roll 100 is fast on a shaft 105 journaled in the side walls of a hopper extension 106. The closure receiving compartment 107 in which the counterweighted plate 24 is supported is connected to the extension 106 as shown. The shaft 105 is arranged to be driven at a relatively slow rate of speed through connections including a chain and sprocket drive 108 to an intermediate shaft 109 which is connected by a second chain and sprocket drive 110 to the output shaft of a speed reducing unit 112. The input shaft of the speed reducing unit 112 is connected by a third chain and sprocket drive 114 to a drive shaft 115 journaled in a bracket 116 and which is connected to the driven member 117 of the normally engaged clutch unit 102. The clutch unit 102 may comprise a commercially available type of friction clutch which also includes a drive pulley 120 connected by a belt 122 to a motor 124 as illustrated. The clutch unit 102 further includes friction plates 130, 132 arranged one on each side of the pulley 120. The friction clutch is normally maintained in driving relationship by an operating pin 128 urged outwardly by a coil spring 142, and the plunger 32 of the pneumatic control mechanism 22 is arranged to engage the operating pin 128 to push it inwardly to effect disengagement of the friction clutch.

In operation the feed roll 100 serves to lift and free the closures at the bottom of the trough and to advance the same over the feed roll to fall by gravity onto the counterweighted plate 24. In order to further control the release of closures from the delivery end of the hopper 10, a resilient flap 150 may be supported by vertical adjustment above and immediately in front of the feed roll 100 as illustrated. The resilient flap 150 may comprise a relatively thick sheet of rubber or like material having longitudinal slits cut therein providing a plurality of individual depending flexing fingers 151, the resilient flap being effective to hold back and to prevent the escape of closures in the upper portion of the trough. In other words a stream of controlled thickness is provided by the resilient flap to assure a controlled release of the closures from the hopper 10.

In the operation of the modified form of the apparatus the feed roll 100 will continue to rotate to supply closures at a controlled rate into the compartment 107, across the counterweighted plate 24 and through the opening in the compartment to join the group on the carrier 12. Such operation of the feed roller 100 will continue as long as the closures withdrawn from the group are substantially equal to the controlled supply of closures released by the roller 100 to maintain a substantially constant number of closures in the group on the carrier. However, in the event that the number of closures being accepted by the orienting mechanism is reduced, the group of closures in the carrier will be increased to an extent such as to impede the flow of closures from the plate. The weight of the closures thus accumulated on the plate will effect downward rocking thereof to actuate the pneumatic control mechanism 22 and extend the plunger 32 into engagement with the operating pin 128 to disengage the clutch and discontinue rotation of feed roller 100. Subsequently, when the group of closures on the carrier is again reduced by continued withdrawals therefrom by the orienting mechanism, the accumulated closures on the plate 24 are free to join the group, thus reducing the number of closures on the plate and permitting upward rocking of the plate and engagement of the clutch to again initiate rotation of the feed roller 100.

From the above description it will be observed that the present closure handling apparatus embodies novel control mechanism for controlling the supply of closures being delivered from the bulk supply hopper, and is adapted to terminate delivery of the closures from the supply hopper when the number of closures in the group on the carrier exceeds a normal amount commensurate with the withdrawal rate of the orienting mechanism whereby to maintain a substantially constant number of closures in the group for most efficient operation of the orienting mechanism. In practice it was found that the efficiency of the orienting mechanism in terms of the number of closures accepted by the orienting mechanism and deposited in the delivery chute was increased by approximately 50% when the supply of closures delivered thereto from the supply hopper is controlled in the manner described.

While the present closure handling apparatus for controlling the supply of closures or other articles from the supply hopper has been herein illustrated and described as used with a particular form of commercially available selecting and orienting machine, it will be understood that the invention may be used with other closure or article handling machines and that the particular control mechanism may be embodied in other forms within the scope of the following claims.

This application is a division of my copending application, Serial No. 721,591, filed March 14, 1958, now abandoned.

Having thus described the invention, what is claimed is:

1. In a closure handling machine for orienting and feeding closures, in combination, a continuously rotated inclined carrier, means for delivering closures at a controlled rate and in a substantially continuous stream onto said continuously rotated inclined carrier to form a group thereof from which the closures are withdrawn at random and at an indeterminate rate, said delivery means including a bulk supply hopper having an inclined bottom wall and having a discharge opening in an end wall thereof, a driven feed roll disposed at said discharge opening for controlling said continuous stream delivery and arranged to terminate delivery when rotation of the feed roll is discontinued, an intermediate compartment disposed below the level of said supply hopper for receiving said closures, said compartment having side walls and being open at top and bottom, one of the side walls having an opening therein communicating with said inclined carrier, said driven feed roll providing a substantially continuous and uniform flow of closures through said compartment and through said side wall opening to the carrier, and control means operatively connected to said feed roll including a pivotally mounted inclined counterweighted plate closing the bottom of said compartment and arranged to guide the closures through said compartment side wall opening in a continuously moving stream to join the group on the continuously rotated inclined carrier, said group being arranged to impede the continuous flow of closures across said inclined plate when the group on the carrier is increased beyond a predetermined amount, said control means being responsive to the weight of an accumulation of closures in said compartment impeded in their travel on said plate for discontinuing rotation of said feed roller to terminate delivery of closures from said supply hopper, and for initiating rotation of said feed roller to start delivery of closures when the group is decreased below said predetermined amount to permit said free flow of closures across the plate whereby to maintain a substantially uniform group of closures on said carrier commensurate with the indeterminate rate of withdrawal and to prevent an excessive accumulation of closures in said compartment whereby to maintain a free flow of closures through said side wall opening of the compartment when the closures on the carrier are decreased.

2. In a closure handling machine for orienting and feeding closures, in combination, a continuously rotated inclined carrier, means for delivering closures onto the continuously rotated carrier to form a group thereof from which the closures are withdrawn at random and at an indeterminate rate, said delivery means including a bulk supply hopper having an inclined trough, a driven feed roll disposed at the delivery end of said trough for controlling the release of closures from the supply hopper in a substantially continuous stream, an intermediate compartment open at top and bottom disposed to receive the closures from the supply hopper and having an opening in communication with said carrier, and control means operatively connected to said feed roll including an inclined counterweighted plate forming the bottom of said compartment and across which the closures released from the supply hopper may normally flow freely by gravity through said opening to join the group on the continuously moving carrier, said group being arranged to impede the flow of closures across said plate and through said opening when the group is increased beyond a predetermined amount, said control means being responsive to the weight of an accumulation of closures impeded in their travel on said plate for discontinuing rotation of said feed roller to terminate delivery of closures from the supply hopper, and for initiating rotation of said feed roller to start delivery of closures when the group is decreased below said predetermined amount and the plate is again cleared of closures to permit said free flow of closures across the plate, said intermediate compartment being disposed above an inclined edge of the rotary carrier spaced from the lowermost edge in the direction of rotation of the carrier, and said counterweighted plate being inclined both longitudinally and transversely to guide the closures toward the lowermost edge of the inclined carrier.

3. A closure handling machine as defined in claim 2 wherein the control means includes a pressure responsive pneumatically operated unit cooperating with said plate upon rocking of the latter under the influence of the weight of the closures impeded thereon.

4. A closure handling machine as defined in claim 3 which includes means for driving said feed roller comprising a normally engaged clutch, said pneumatically operated control means being arranged to effect disengagement of the clutch to discontinue rotation of said feed roller when the group is increased beyond a predetermined normal amount and to permit engagement of said clutch when the accumulation of closures in said group is decreased below said normal amount.

References Cited in the file of this patent

UNITED STATES PATENTS

| | | |
|---|---|---|
| 504,125 | Dougan | Aug. 28, 1893 |
| 1,506,294 | Faber | Aug. 26, 1924 |
| 1,992,716 | Paxton | Feb. 26, 1935 |
| 2,198,137 | Suppiger | Apr. 23, 1940 |
| 2,286,554 | Lieberman | June 16, 1942 |
| 2,466,386 | Curioni | Apr. 5, 1949 |
| 2,592,642 | Bardet | Apr. 15, 1952 |
| 2,617,556 | Hulett | Nov. 11, 1952 |
| 2,715,978 | Sherling | Aug. 23, 1955 |
| 2,985,338 | Everett | May 23, 1961 |

FOREIGN PATENTS

| | | |
|---|---|---|
| 583,753 | Great Britain | Dec. 30, 1946 |
| 544,575 | Italy | June 16, 1956 |